US005729320A

United States Patent [19]
Eidenschink et al.

[11] Patent Number: 5,729,320
[45] Date of Patent: Mar. 17, 1998

[54] LIQUID CRYSTALLINE MEDIUM INCLUDING CLOSELY PACKED PARTICLES AND METHOD FOR GENERATING IMAGES USING SAME

[75] Inventors: Rudolf Eidenschink, Mohnstrasse 6 D-6500, Mainz; Britta Nagel, Bingen, both of Germany

[73] Assignee: Rudolf Eidenschink, Mainz, Germany

[21] Appl. No.: 359,009

[22] Filed: Dec. 19, 1994

Related U.S. Application Data

[63] Continuation of Ser. No. 149,128, Nov. 5, 1993, abandoned, which is a continuation of Ser. No. 770,174, Oct. 2, 1991, abandoned.

[30] Foreign Application Priority Data

| Oct. 12, 1990 | [DE] | Germany | 40 32 392.7 |
| Dec. 21, 1990 | [DE] | Germany | 40 41 209.1 |
| Jun. 18, 1991 | [DE] | Germany | 41 19 969.3 |

[51] Int. Cl.$^6$ .............. G02F 1/133; G02F 1/13
[52] U.S. Cl. .............. 349/166; 349/20; 349/22; 349/23
[58] Field of Search .............. 359/43, 45, 46, 359/62, 103; 349/166, 20, 22, 23

[56] References Cited

U.S. PATENT DOCUMENTS

| 4,025,163 | 5/1977 | Saxe et al. | 350/160 R |
| 4,270,841 | 6/1981 | Saxe | 350/374 |
| 4,458,988 | 7/1984 | Pettersen | 359/81 |
| 4,526,818 | 7/1985 | Hoshikawa et al. | 359/81 |
| 4,666,253 | 5/1987 | Yoshida | 359/103 |
| 4,701,024 | 10/1987 | Kobayashi et al. | 359/103 |
| 4,946,623 | 8/1990 | Tabony | 359/103 |
| 5,138,472 | 8/1992 | Jones et al. | 359/52 |

FOREIGN PATENT DOCUMENTS

| 0066965 | 12/1982 | European Pat. Off. | |
| 54-21859 | 2/1979 | Japan | |
| 60-247622 | 12/1985 | Japan | |
| 61-025126 | 2/1986 | Japan | |
| 0165735 | 7/1986 | Japan | 359/46 |
| 1-267516 | 10/1989 | Japan | |
| 2-70789 | 3/1990 | Japan | |
| 2-178616 | 7/1990 | Japan | |
| 2-205821 | 8/1990 | Japan | |
| 2-240192 | 9/1990 | Japan | |
| 2-280122 | 11/1990 | Japan | |

OTHER PUBLICATIONS

C.F. Hayes, "Magnetic Platelets in a Nematic Liquid Crystal", Mol. Cryst. Liq. Cryst., 1976, vol. 36, pp. 245–253.

L.R. Snyder, et al., *Introduction to Modern Liquid Chromatography*, John Wiley & Sons (New York, 1974), pp. 172–185.

H. Kelker, et al., *Handbook of Liquid Crystals*, (Verlag Chemie, Weinheim, Deerfield Beach, Basel, 1980), pp. 386–387.

Degussa, *Technical Bulletin Pigments—Basic Characteristics*, No. 11, 3rd Ed., Oct., 1982.

"Grundlagen von Aerosil", Schriftenreihe Pigmente, No. 11, pp. 45, 63, 78, Degussa, Frankfurt (Aug. 1991).

Eidenschink et al, "Static Scattering in Filled Nematic: New Liquid Crystal Display Technique", Electronics Letters, vol. 27, No. 13, pp. 1195–1196 (Jun. 20, 1991).

*Primary Examiner*—Anita Pellman Gross
*Attorney, Agent, or Firm*—Marshall, O'Toole, Gerstein, Murray & Borun

[57] ABSTRACT

Closely packed small particles dispersed in a liquid crystalline phase, whereby the particles can be moved toward one another by external influence, constitute a liquid crystalline medium permitting the generation of bistable images without the requirement of matching the indices of refraction of the components.

42 Claims, 2 Drawing Sheets

LIQUID CRYSTALLINE MEDIUM INCLUDING CLOSELY PACKED PARTICLES AND METHOD FOR GENERATING IMAGES USING SAME

This is a continuation of U.S. application Ser. No. 08/149,128 filed Nov. 5, 1993, now abandoned, which is a continuation of U.S. application Ser. No. 07/770,174 filed Oct. 2, 1991, now abandoned.

BACKGROUND OF THE INVENTION (a) Field of the Invention

This invention relates to a liquid crystalline medium, a method to generate images using characteristic properties of the same and devices using these properties.

(b) Description of the Prior Art

There are a number of different methods of modulating light to generate images by the aid of liquid crystalline phases. Most devices are based on variations of the twisted nematic cell (TNC), see M. Schadt, Liquid Crystals 5, 57 (1989) using polarised light. The transition from a nematic phase to a smectic A phase brought about by change of temperature or heat can lead to a transparent or a light scattering layer, making feasible electrooptic devices without polarizers (D. Coats in *Thermotropic Liquid Crystals*, John Wiley & Sons 1987, p. 99; FR 2 482 345). More recently, the so-called PDLC-devices have been developed utilizing light scattering at the surfaces of nematic droplets embodied in polymer materials. By matching the indices of refraction of the nematic (birefringent) phase and the containment medium properly, a transparent state can be reached when a permanent electric field is applied across the layer (see J. L. West, Mol. Cryst. Liq. Cryst. 157, 427 (1988)).

These techniques are in need of improvement for various applications. Thus devices using polarizers suffer from the principle of loss of light intensity. Devices making use of the phase change to a smectic phase can be used only within a small temperature range and are difficult to manufacture. For a good quality of the transparent state PDLC devices require a high suitability of the indices of refraction of the ordinary ray of the nematic and of the polymer which by now is only possible in a limited temperature range.

Also devices based on the change of optical properties of liquid crystal layers containing dispersed solid particles are known. In U.S. Pat. No. 4,701,024 the orientation of rod-like particles dispersed in a liquid crystalline phase is described. The change of transparency of a discoid-nematic layer containing ferroelectric particles by an electric field is known from FR 2,544,731. The variation of optical properties of dispersions of particles of polymeric materials dispersed in a liquid crystal polymer by the application of an electric field or by the absorption of light has also been described (JP 01/161 222). Instead of dispersions, organic polymer networks of considerable spatial extension can be used to effect light scattering (JP 02/70 799). It is also known that in certain processes leading to the production of PDLC foils polymer particles can be embodied in the nematic phase (N. A. Vaz, Proc. Spie-Conference, Santa Clara, 1990; see also JP 01/161,222).

The efficiency in modulating light of these devices, which make use of liquid crystal layers containing solid particles, depends on the matching of the optical properties of both components. Their stability towards sedimentation in liquid crystal phases of low molecular weight is weak. Therefore highly viscous polymer liquid crystals are recommended (JP 01/161222). Another disadvantage, particularly with respect to devices with high information density, is the difficulty to reach bistability of the transparent and the scattering state which has not yet been accomplished for nematics.

SUMMARY OF THE INVENTION

The object of the present invention is to provide a stable, easily producible liquid crystalline medium by which bistable optical images in optical devices can be obtained.

Another object of the present invention is a device comprising this medium.

Further, another object of the present invention is a method of generating bistable images.

According to the present invention, the above mentioned objects are attained by a liquid crystalline medium comprising a liquid crystalline phase and closely packed solid particles, whereby the ratio Q between the volume displaced by the particles and the relative volume of the solid particles is between 0.005 and 0.15, wherein the condition that the particles can be moved towards each other by external influence.

The invention also provides a device comprising the inventive liquid crystalline medium disposed between two plates, at least one of which is transparent, a method of generating visible images on the device, the use of the device as a television screen, data storage medium, or for overhead projection, and the use of the liquid crystalline medium in a display.

Surprisingly, a highly efficient light scattering layer of the medium of the invention becomes transparent in an electric field and maintains it transparency to a high degree after the field has been switched off. Further surprisingly, this layer can be made to acquire light scattering properties by the application of mechanical force or by irradiation, as with electromagnetic waves or by raising its temperature and subsequent cooling. This scattering can be transformed back into transparency by an electric field.

Other objects and advantages of the invention will be apparent from the following detailed description, taken in conjunction with the drawings and the appended claims.

DETAILED DESCRIPTION

Figure 1A:
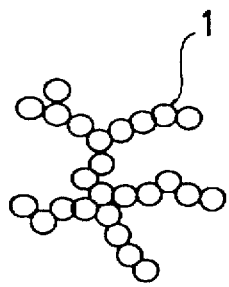
FIG. 1A shows a particle comprising an aggregate of primary particles 1 aggregated by covalent chemical bonds.
Figure 1B:
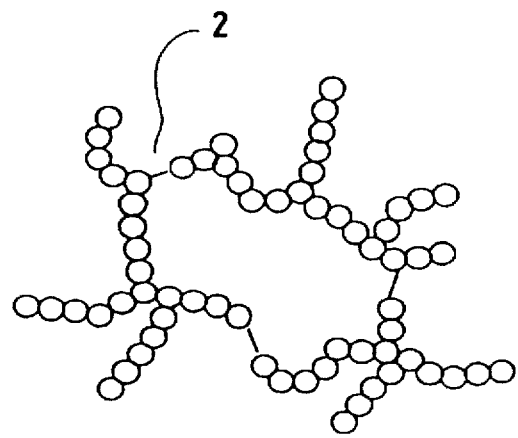
FIG. 1B shows how the particles can be agglomerated by non-covalent bonds 2, such as hydrogen bonds, van der Waals interactions, or orbital interactions.
Figure 2A:
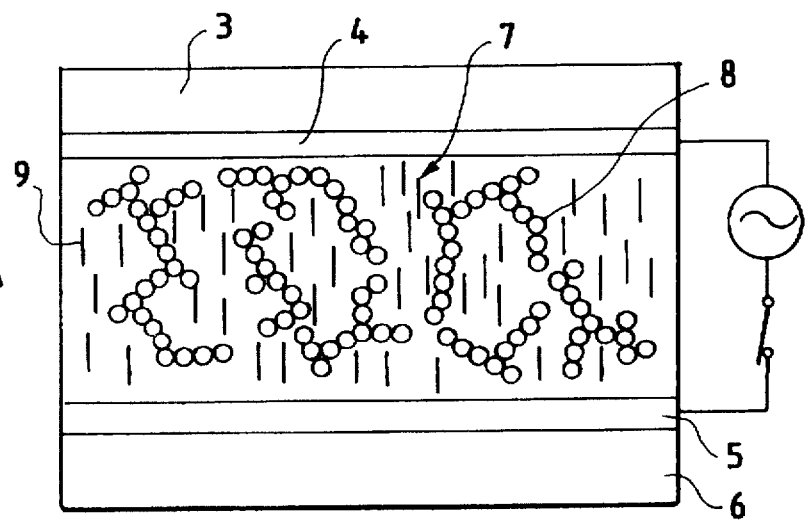
FIG. 2A demonstrates the transparent state of a device generated by an electric field, including glass plates 3 and 6, transparent electrodes 4 and 5 and a liquid crystalline medium 7. The medium comprises solid particles 8 and a thermotropic nematic phase 9. The parallel rods depict the long shaped molecules orientated homeotropically.
Figure 2B:
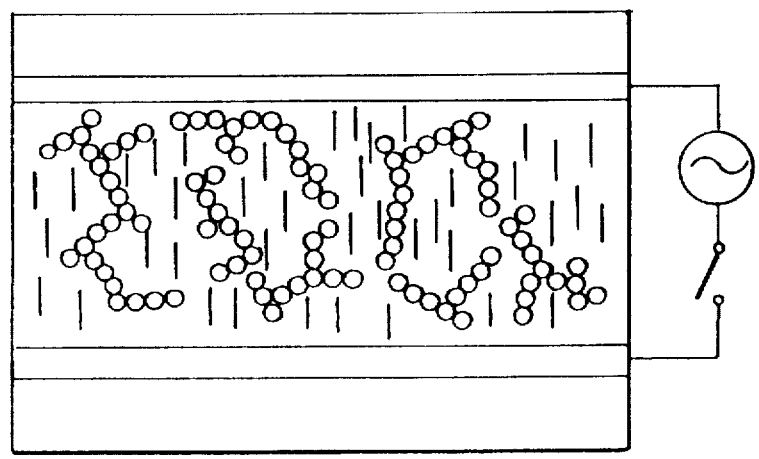
FIG. 2B demonstrates that after switching off the electric field the transparent state of the device of FIG. 2A is preserved.
Figure 2C:
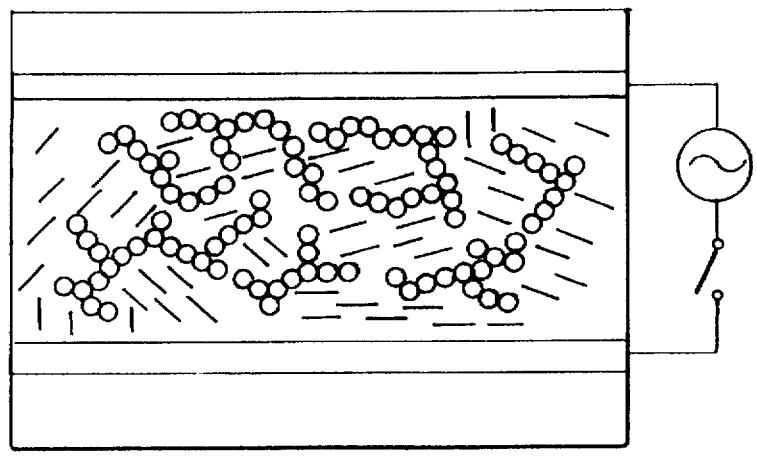
FIG. 2C demonstrates the change in the arrangement of the solid particles and the nematic phase brought about by an external action onto the medium. The orientation within small domains is random. The device is scattering light.

The liquid crystalline compounds used for the preparation of the liquid crystalline medium can be polymeric or non-polymeric. Preferably they are non-polymeric. The liquid crystalline phase may be a single compound or a mixture of compounds. Such compounds are generally known (see D. Demus and H. Zaschke, Flüssige Kristalle in Tabellen, Vol. I (1974) and Vol. II (1984), Leipzig). Preferred are compounds of the general formula I, below:

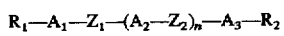

whereby $R_1$ and $R_2$ can be independent of each other, an unsubstituted, or at least a monohalogen substituted alkyl or alkenyl rest with 1 to 15 carbon atoms, wherein one or more $CH_2$-groups can be independently replaced by —O—, —CO—, —COO—, —OOC— or —OCOO— in such a way that no O-atoms are adjacent to each other, H, halogen, —CN, —$CF_3$, —$OCHF_2$, —$OCF_3$ or —NCS;

$A_1$, $A_2$, $A_3$ can be independent of each other, a trans-1, 4-cyclohexylen group being unsubstituted or substituted by at least one halogen atom and wherein one or two not adjacent $CH_2$-groups can be replaced by —O— and/or —S—, a 1,4-phenylene group being unsubstituted or substituted by —CN or at last one halogen atom, wherein one or two CH-groups can be replaced by N, a 1,4-bicyclo[2.2.2]octylene group or a 1,3-bicyclo[1.1.1]pentylene group;

$Z_1$, $Z_2$ can be independently of each other —COO—, —OOC, —$CH_2O$—, —$OCH_2$—, —C≡C—, —CH=CH—, —$CH_2CH_2$— or the single bond; and n can be 0, 1 or 2.

By now three kinds of liquid crystalline phases can be formed of the rod-like molecules of formula I, namely the nematic, the cholesteric and various smectic phases (see H. Kelker, R. Hatz, Handbook of Liquid Crystals, Verlag Chemie, Weinheim 1980). The cholesteric phase is understood as a special case of the nematic phase in the present invention.

In this invention the nematic phase is particularly preferred. The smectic A phase is also highly desirable. Included in this invention is also the discoid-nematic phase formed by plate-like molecules.

It has also been discovered that the quality of the transparent state of the electrooptical device (field-on or field-off) depends only negligibly on the indices of refraction of the liquid crystal phase and the solid particles. As with the known electrooptical devices on the basis of light scattering—e.g. in the case of dynamic scattering—a high value of the optical anisotropy, $\Delta n$, is advantageous for a high contrast. $\Delta n$ in the case of the uniaxial nematic phase and the smectic A phase is the difference between the refractive indices for the extraordinary and the ordinary ray.

The dielectric anisotropy, $\Delta\varepsilon$, of the liquid crystal phase can be positive or negative, depending on whether in an electric field the long axis of the molecules align parallel with or perpendicular to the direction of the field. The medium can also be used in light shutters that can be operated without an electric field: by raising the temperature of the device above the transition point to the isotropic liquid it becomes transparent, after cooling below this temperature it becomes light scattering again. For this application $\Delta\varepsilon$ can also be zero.

The liquid crystalline phase can contain dissolved dyes, particularly dichroic dyes (see R. Eidenschink, Kontakte 1984 (2), 25). In devices built according to the invention dichroism has a greater effect than in the case of the PDLC display where the dye can migrate into the polymer containment. Moreover, the liquid crystal phase can contain dissolved salts to produce electrohydrodynamic effects, or non mesogenic compounds, e.g. to alter viscosity or to modify the physico-chemical interactions between the solid particles and the liquid crystalline phase, as well as antioxidants to improve the stability of the organic compounds. This invention also incorporates organic compounds that form microcrystals or crystalline networks in the liquid crystalline phase on cooling, such as alginic acid or organic derivatives of castor oil which are regarded as parts of the liquid crystal phase.

The particles of the medium preferably consist of inorganic materials which may contain organic matter on their surfaces. Particles which consist essentially of oxides of silicon, aluminum or titanium are preferred. Particularly preferred are particles of pyrogenic silica and modified pyrogenic silica. Modification can be brought about by the reaction of the ≡SiOH groups on the surface of the silica with organosilicon compounds leading to silanized pyrogenic silica or with other organic compounds (see M. Ettlinger et al., Arch. Pharm. 320, 1 (1987). Preferably these particles do not have organic groups linking them with other particles. In the case of derivatization with acrylate groups the particles can react under the influence of light or after addition of an initiator either with each other or with an organic prepolymer. Generally, solid particles interlinked by organic groups or components are enclosed as particles in this invention if they can be moved towards each other sufficiently easily. This is then the case if the sum of the masses of the organic moiety introduced for derivitization and those of the linking groups does not exceed the mass of the original particle. For derivitized and interlinked inorganic particles sufficient mobility can be assumed the carbon content of the solid isolated from the liquid crystalline medium after the extraction with a suitable organic solvent is below 40 mass per cent.

The liquid crystalline medium of the present invention consists of two volumes: volume $V_1$ occupied by the solid particles, i.e. the volume displaced by these particles in a gas or a liquid and the volume of the liquid crystalline phase. Because the liquid crystalline phase occupies the free space between the densely packed solid particles, the sum of these two partial volumes is designated as relative volume of the solid $V_2$.

The liquid crystalline medium of the present invention comprises a liquid crystal phase and closely packed particles, whereby the quotient Q between the volume $V_1$ displaced by the particles and the relative volume of the solid particles $V_2$ ($Q=V_1/V_2$) is between 0.005 and 0.15, preferably between 0.01 and 0.06.

The portion of the volume of the liquid crystalline phase as well as of the solid particles can be calculated from the masses and the corresponding densities. The densities of the particle free liquid crystalline phases are normally between 0.95 and 1.15 g/cm$^3$. The densities of the solid particles can vary on a larger scale. Highly disperse metal oxides produced by the Aerosil-Procedure (Degussa AG, Frankfurt) have the following densities:

| silica | 2.2 g/cm$^3$, |
|---|---|
| aluminum oxide | 2.9 g/cm$^3$ |
| titanium oxide | 3.8 g/cm$^3$ and |
| zirconium oxide | 5.4 g/cm$^3$ |

(Data by Degussa AG, Schriftenreihe Pigmente, No. 56).

It has been discovered that liquid crystalline media comprising a liquid crystalline phase and closely packed solid particles which can be moved towards each other by external influence are suitable for the production of images in optical devices. Compared to the—non bistable—devices of the prior art mentioned above using polymer containments or polymer networks, the liquid crystalline medium of the present invention contains a high portion of the liquid crystalline phase. This permits the construction of optical devices with particularly small distances between the transparent plates. These devices, in accordance with the laws of optics, give rise to better quality images.

The particles used in the present invention have average diameters of the primary particles between 2 and 90 nm, preferably 5 to 40 nm. Values for different types of pyrogenic silica as well as their distribution curves can be seen from the brochure "Aerosil" by Degussa. The association and aggregation between such primary particles leading to complex shaped particles used to produce the liquid crystalline medium are also described here.

Within this invention it is also possible to use mixtures of solid particles of different materials, surface derivatization or shape.

To obtain bistability, the use of solid particles of a high specific area is advantageous. The values measurable by the known BET method are between 30 m$^2$/g (e.g. VP Zirkonium Oxide of Degussa) and 700 m$^2$/g (e.g. split particles of Chromosorb 105 of E. Merck). It is also possible to measure the BET surface of the dried solid particles isolated from the liquid crystalline medium after extraction of the liquid crystal phase by a suitable organic solvent.

The quality of the images produced by the method of the present invention depends on the specific interaction between the surface of the solid particles and the molecules forming the liquid crystal phase. Besides particles of underivatized silica, particles chemically bonded to trialkylsilyl groups (also with fluoro-substituted alkyl groups), dimethyl silyl moieties and oligo-dimethylsiloxy moieties are preferred. Also preferred are particles chemically linked to aryl or alkenyl groups.

To obtain images of high quality a sufficiently dense package of the particles is essential. The solid particles are dispersed into the low viscous nematic phase at room temperature by stirring. In the case of the highly viscous smectic phases this must be done at elevated temperatures in the nematic or isotropic state of the material. After this, an enhancement of the particle density can be achieved by centrifugation. It has been found that the particles are sufficiently closely packed if in a test-centrifugation of 5 minutes at a radial acceleration between 13800 and 21600 m/sec$^2$ (1407 and 2202 g) Q can be raised to a maximum of 1.7 fold of its initial value. Particularly advantageous are media the Q of which can be increased at most to the 1.1 fold or which cannot be densified under these conditions at all.

At least one of the plates embedding the liquid crystal medium consist of glass or a transparent polymer. They can be clad with transparent electrodes of indium and tin oxides (ITO) as it is state of the art with TNC. The thickness of the layer can be adjusted by application of commercial spacer particles, preferably between 2 to 30 μm which can be added to the medium. The ITO electrodes can absorb LASER light (see D. Coats) which can be exploited to heat up the layer of the medium, in the extreme case beyond the transition temperature of the liquid crystal phase. Also dyes which absorb LASER light can be added to the medium or can be part of the solid particles if the chromophore has covalent bonds to the particle.

The medium of the invention makes feasible the preparation of an erasable data storage: in a liquid crystalline medium in its transparent state of the present invention, a strongly light scattering region can be generated by absorption of LASER light. This scattering region can be erased by the electric field of another LASER beam or by an electric field applied to the electrodes of the device.

In the case of very weak interactions between the solid particles and the molecules forming the liquid crystalline phase small regions of the medium of the present invention can adopt a molecular orientation parallel to the electric field of a polarized LASER beam which can be read out by another beam. Erasure can occur by an electric field across the plates or by reorientation of the region by a differently polarized LASER. In this case no light scattering region is needed.

The generation of light scattering areas on a device which is in its transparent state is possible by sending a ray of ultrasound through the medium. It has been found that a frequency of 800 kHz yields images of better contrast than a frequency of 30 kHz.

The generation of light scattering over the total area of the device can be brought about by a force moving the plates towards one another. This can be done e.g. by an electrostrictive element. The scattering is created by the generation of small regions of different molecular orientation in the medium by shear movement.

The use of the liquid crystalline medium of this invention is not restricted to the generation of bistable images. Because of its high value of the specific electric resistance it can also be used advantageously if the light scattering is almost not visible. In such a case also bistability is negligible. If the liquid crystalline component is a nematic phase the medium can be used in a cell based on the principle of the twisted nematic cell using two polarizers. The achievable high specific resistance (>10$^{12}$ Ωcm) is of particular interest for displays with active matrix addressing (T. Shimasaka et al., Proc. Jap. Display, Sept. 1988, p.78, Tokyo). Thus, a liquid crystalline medium consisting of nematic phase ZLI 1132 (E. Merck, Darmstadt) and solid particles or Aerosil 200 (Degussa AG) that had been heated for 2 hours at 1000° C. in a muffle furnace whereby a value for Q of 0.005 was attained, had a distinctly higher specific resistance than phase ZLI 1132, the initial value of which is at 10$^{11}$ Ωcm.

The following abbreviations and dimensions are used in the examples:

mp=melting point,
$T_{NI}$=transition temperatures from the nematic to the isotropic phase,
Δn=optical anisotropy at 20° C.,
Δε=dielectric anisotropy at 20°,
rpm=rotations per minute,
d=density in g/cm$^3$ at 20° C.,
D=average diameter of the primary particle,
s=specific surface accordance to the BET method in m$^2$g

EXAMPLE 1

0.41 g of the pyrogenic silica Aerosil 200 (Degussa AG, D=12 nm, S=200, d=2.2) were added under intense stirring to 10 g of the nematic phase E7 (Merck Ltd., Poole, d=1.02, Δn 0.26, Δε+15). This dispersion was filled 5 cm high into a cylindrical centrifuge tube and centrifuged at room temperature at 3700 rpm for 2 minutes. The inner bottom of the tube had a distance of 14 cm from the center of rotation. After centrifuging, the tube contained a column of 4.7 cm of white dispersion and 0.3 cm of the particle free nematic phase above, clearly distinguishable from the light scattering part. The nematic phase was siphoned off. The remaining liquid crystalline medium had a calculated volume ratio of the solid particles of 1.9 volume percent or a Q=0.019. To check whether the particles were packed close enough 2 ml of the medium were centrifuged in a tube for 5 minutes at 3700 rpm, whereby the values of the radial acceleration were within the limit of the first centrifugation. The volume of the white dispersion was 1.6 cm$^3$ and the volume of the pure nematic phase 0.4 cm$^3$. This gives an increase of Q by the 1.25 fold.

EXAMPLE 2

0.20 g of the silica Aerosil R972 (Degussa, silanized, D=16 nm, S=110, d=2.2) and 0.20 g of the silica Aerosil 380 (D=7 nm, S=380, d=2.2) were added under stirring to 10 g of a nematic phase (d=1.03, mp<0° C., $T_{NI}$ 57° C.) consisting of 33.7% 4'-Pentyl-biphenyl-4-carbonitrile
19.8% 4'-Heptyl-biphenyl-4-carbonitrile
7.9% 4'-Propyloxy-biphenyl-4-carbonitrile
7.9% 4'-Heptyloxy-biphenyl-4-carbonitrile
10.9% 4'-Octyloxy-biphenyl-4-carbonitrile
5.0% 4'-(trans-4-Pentylcyclohexyl)-biphenyl-4-carbonitrile
7.4% 4-Ethoxy-4'-methyl-tolan
7.4% 4-Ethyl-4'-methoxy-tolan (numbers are mass percent). The nematic dispersion was densified in the centrifuge according to the procedure of Example 1 for 10 min at 3700 rpm. According to the determined ratio of the volumes of the resulting densified dispersion and the pure nematic phase a value of 0.026 was calculated for Q. The particle free nematic phase was siphoned off. A sample of the remaining liquid crystalline medium was centrifuged for 5 min at 3700 rpm. The increase of Q was estimated to be 1.02 fold.

EXAMPLE 3

A liquid crystalline medium prepared from 0.10 g Aerosil R972, 0.30 g Aerosil 200 and 10 g of the nematic phase of Example 2 under the conditions specified there have a Q value of 0.027. The medium was placed between two glass plates with ITO electrodes at a distance of 18 μm. The initially non-transparent device became transparent when an electric voltage (180 V, 50 Hz) was applied (state 1). After the field had been switched off transparency remained to a high degree (state 2). The device became non-transparent when the plates were moved parallel to each other for a small portion

EXAMPLE 4

The device of Example 3 in the state 2 was treated with ultrasound (800 kHz, water layer between the piezoelectric crystal of the ultrasound source and the glass plate of the device). The areas of the device exposed to radiation became non-transparent, comparable to state 3 of Example 3. By application of an electric field these areas can be made transparent again (state 1). The cycle between states 1, 2 and 3 can be repeated.

EXAMPLE 5

The device of Example 3 in its transparent state 2 is radiated with a YAG-LASER (Ytrium-aluminum-garnet). The areas of the device radiated became non-transparent, comparable to state 3 of Example 3. By application of an electric field these areas can be made transparent again (state 1). The cycle between states 1, 2 and 3 can be repeated.

EXAMPLE 6

5.0 g of the liquid crystal phase S7 (Merck Ltd., Poole, transition smectic A to nematic 56, 1° C., $T_{NI}$ 56.8° C., d=0,945) were stirred at 60° C. with 0.52 g or silica Aerosil 200 and 0.10 g Aluminumoxid C (Degussa AG, D=13 nm, S=100, d=2,9) resulting in a Q value for the liquid crystalline medium of 0.049. By centrifugation at a temperature range between 80° and 60° for 5 min under the radial acceleration of Example 1 Q could not be increased.

We claim:

1. A liquid crystalline medium for the generation of bistable images comprising a nematic liquid crystalline phase containing solid particles dispersed therein, forming a free space between the particles, said liquid crystalline medium having a ratio of $V_1$ to $V_2$ in the range of 0.005 to 0.15, inclusive, where $V_1$ is the partial volume displaced by said solid particles and $V_2$ is the sum of $V_1$ plus the partial volume of the liquid crystalline phase that occupies the free space between the particles, said solid particles being movable toward each other by external influence;

the packing of said solid particles being sufficiently close that a radial acceleration of said dispersion, between 13,800 m/sec$^2$ and 21,600 m/sec$^2$ for five minutes, produces a ratio of $V_1/V_2$ which is no greater than 1.7 times said ratio before said radial acceleration.

2. The medium of claim 1, in which said solid particles have a specific surface of 30 to 700 m$^2$/g.

3. The medium of claim 1, in which said solid particles have an average primary diameter of 2 to 90 nm.

4. The medium of claim 3 wherein said particles have an average primary diameter of 5 to 40 nm.

5. The medium of claim 1, in which said particles comprise an inorganic material.

6. The medium of claim 1, in which said particles comprise pyrogenic silica.

7. The medium of claim 6, in which said pyrogenic silica is chemically derivitized by groups containing organic moieties.

8. A device comprising a liquid crystalline medium of claim 1 disposed between two plates at least one of which is transparent.

9. A method of generating bistable images on the device of claim 8 by transforming a transparent region into a less transparent region which can be transformed into a transparent region by an electric field, said first transforming step being effected through the action of a mechanical force on the medium,
   through raising and subsequent lowering the value of temperature of the medium, or
   through interaction of the medium with electromagnetic waves.

10. The method of claim 9, wherein said action of said mechanical force occurs by ultrasound or by movement of said plates toward one another.

11. The method of claim 9, wherein said electromagnetic waves originate from a LASER.

12. A television screen, data storage device or overhead projection device comprising the device of claim 8.

13. The medium of claim 1, wherein said ratio is in the range of 0.01 to 0.06, inclusive.

14. The medium of claim 1, wherein said ratio is increased to a maximum of 1.1 fold of its initial value.

15. A liquid crystalline medium for the generation of bistable images comprising a nematic liquid crystalline phase containing closely packed solid particles dispersed therein, forming a free space between the particles, said liquid crystalline medium having a ratio of $V_1$ to $V_2$ in the range of 0.005 to 0.15, inclusive, where $V_1$ is the partial volume displaced by said solid particles and $V_2$ is the sum of $V_1$ plus the partial volume of the liquid crystalline phase that occupies the free space between the particles, and wherein said solid particles being movable toward each other by external influence;

the packing of said solid particles being closely packed when they are sufficiently close that a radial acceleration of said dispersion, between 13,800 m/sec$^2$ and 21,600 m/sec$^2$ for five minutes, produces a ratio of $V_1/V_2$ which is no greater than 1.7 times said ratio before said radial acceleration.

16. The medium of claim 15 wherein said ratio is in the range of 0.01 to 0.06, inclusive.

17. The medium of claim 15 wherein said ratio is increased to a maximum of 1.1 fold of its initial value at said radial acceleration.

18. The medium of claim 15 wherein said solid particles have an average primary diameter of 2 nm to 90 nm.

19. The medium of claim 18 wherein said particles have an average primary diameter of 5 nm to 40 nm.

20. The medium of claim 15 wherein said solid particles have a specific surface of 30 m$^2$/g to 700 m$^2$/g.

21. The medium of claim 15 wherein said particles comprise an inorganic material.

22. The medium of claim 21 wherein said particles comprise pyrogenic silica.

23. The medium of claim 22 wherein said pyrogenic silica is chemically derivitized by groups containing organic moieties.

24. A device comprising a liquid crystalline medium of claim 15 disposed between two plates, at least one of which is transparent.

25. A method of generating bistable images on the device of claim 24 by transforming a transparent region into a less transparent region which can be transformed into a transparent region by an electric field, said first transforming step being effected through the action of a mechanical force on the medium, through raising and subsequent lowering the level of temperature of the medium, or through interaction of the medium with electromagnetic waves.

26. The method of claim 25 wherein said transforming step is effected by action of a mechanical force resulting from application of ultrasound or by movement of said plates toward one another.

27. The method of claim 25 wherein said transforming step is effected through interaction of the medium with electromagnetic waves originating from a LASER.

28. A television screen, data storage device or overhead projection device comprising the device of claim 24.

29. A liquid crystalline medium for the generation of bistable images comprising:

a dispersion of solid particles in a nematic liquid crystalline phase;

said dispersion having a ratio of $V_1/V_2$ in the range of 0.005 and 0.15 inclusive, where $V_1$ is the partial volume displaced by said solid particles and $V_2$ is the sum of $V_1$ plus the partial volume of the liquid crystalline phase that occupies the free space between the particles;

said solid particles being movable toward each other by external influence;

the packing of said solid particles being sufficiently close that a radial acceleration of said dispersion, between 13,800 m/sec$^2$ and 21,600 m/sec$^2$ for five minutes, produces a ratio of $V_1/V_2$ which is no greater than 1.7 times said ratio before said radial acceleration.

30. The medium of claim 29 wherein said ratio is in the range of 0.01 to 0.06, inclusive.

31. The medium of claim 29 wherein said ratio is increased to a maximum of 1.1 fold of its initial value at said radial acceleration.

32. The medium of claim 29 wherein said solid particles have an average primary diameter of 2 nm to 90 nm.

33. The medium of claim 32 wherein said particles have an average primary diameter of 5 nm to 40 nm.

34. The medium of claim 29 wherein said solid particles have a specific surface of 30 m$^2$/g to 700 m$^2$/g.

35. The medium of claim 29 wherein said particles comprise an inorganic material.

36. The medium of claim 35 wherein said particles comprise pyrogenic silica.

37. The medium of claim 36 wherein said pyrogenic silica is chemically derivitized by groups containing organic moieties.

38. A device comprising a liquid crystalline medium of claim 29 disposed between two plates, at least one of which is transparent.

39. A method of generating bistable images on the device of claim 38 by transforming a transparent region into a less transparent region which can be transformed into a transparent region by an electric field, said first transforming step being effected through the action of a mechanical force on the medium, through raising and subsequent lowering the level of temperature of the medium, or through interaction of the medium with electromagnetic waves.

40. The method of claim 39 wherein said transforming step is effected by action of a mechanical force resulting from application of ultrasound or by movement of said plates toward one another.

41. The method of claim 39 wherein said transforming step is effected through interaction of the medium with electromagnetic waves originating from a LASER.

42. A television screen, data storage device or overhead projection device comprising the device of claim 38.

* * * * *